United States Patent [19]

Kobayashi et al.

[11] Patent Number: 4,596,011
[45] Date of Patent: Jun. 17, 1986

[54] DATA TRANSMISSION SYSTEM FOR A LOCAL NETWORK

[75] Inventors: Hiroshi Kobayashi; Tsuguhiro Hirose, both of Tokyo; Hideaki Haruyama, Fujisawa, all of Japan

[73] Assignee: Tokyo Shibaura Denki Kabushiki Kaisha, Kawasaki, Japan

[21] Appl. No.: 563,248

[22] Filed: Dec. 19, 1983

[30] Foreign Application Priority Data

Dec. 22, 1982 [JP] Japan ................. 57-225215

[51] Int. Cl.$^4$ ............. H04J 3/02; H04J 6/00
[52] U.S. Cl. .................. 370/85; 370/94; 340/825.5
[58] Field of Search ........ 970/85, 94, 94 S, 89; 340/825.5

[56] References Cited

U.S. PATENT DOCUMENTS

| | | | |
|---|---|---|---|
| 4,199,663 | 4/1980 | Herzog | 370/85 |
| 4,210,780 | 7/1980 | Hopkins et al. | 370/85 |
| 4,345,250 | 8/1982 | Jacobsthal | 370/85 |
| 4,470,110 | 9/1984 | Chiarottino et al. | 370/85 |
| 4,476,467 | 10/1984 | Terwilliger et al. | 370/85 |

OTHER PUBLICATIONS

IEEE 802 Local Network Standard, Draft B, Chapter V.2, 8.0 Appendix, Oct. 19, 1981.

*Primary Examiner*—Douglas W. Olms
*Assistant Examiner*—Frank M. Scutch, III
*Attorney, Agent, or Firm*—Oblon, Fisher, Spivak, McClelland & Maier

[57] ABSTRACT

A local network, in which a plurality of data processors are coupled by modems to a communication medium, is disclosed. Each modem is arranged to shift a carrier frequency to a first and second frequency according to a digital signal from the associated data processor. In order to provide for reliable and quick detection of a collision of signals simultaneously transmitted from a plurality of modems to the communication medium, the difference between the first and second frequencies is set such that one cycle of a beat signal generated on the communication medium due to a collision of signals is not longer than one bit time length of the digital signal.

11 Claims, 12 Drawing Figures

DATA TRANSMISSION SYSTEM FOR A LOCAL NETWORK

BACKGROUND OF THE INVENTION

This invention relates to a data transmission system, which permits data transmission and reception among data processors connected to a communication medium via interfaces.

A fully distributed peer protocol transmission system or CSMA/CD (carrier sense multiple access with collision detection) system is well known in the art as a bus-shaped network, which does not require any central control station and is readily capable of extension. The system effects baseband transmission via a coaxial cable as a communication line. Recently, in order to improve the efficiency of utility of the coaxial cable, broadband networks are being developed, in which a baseband signal is converted into a carrier transmission signal.

When realizing a CSMA/CD system on a carrier transmission line, it is significant to ensure collision detection characteristics substantially comparable with those on the conventional baseband transmission line and also ensure compatibility with upper protocols.

To meet collision detection characteristics requirements, there are some approaches.

In a first approach, transmitted data is temporarily stored and collated bit by bit with returned data via a transmission line. If the two data are identical for all bits, it is assumed that the data has been transmitted without collision. If the two data differ even for a single bit, it is assumed that a collision has occurred. This system is referred to as bit collation system of transmitted and received data.

In this system, however, it is necessary to demodulate and decode the received signal to obtain received data and also store the transmitted data. This means that, in order to ensure the compatibility with upper protocol, part of functions of upper protocol must be effected by physical levels of lowest protocols. This will complicate the construction and increase cost of a modem as hardware which realizes the physical level. Another peculiar problem of this system is that only a transmitting modem can detect a collision and a receiving modem cannot. Therefore, while a modem is executing a random process called "backoff" after the detection of a collision, another modem which has been in the receiving condition may be entitled to data transmission. This will lead, under a high traffic condition of the network, to a troublesome situation in which a modem which has once encountered a collision will be unable to transmit data indefinitely. Further, the system cannot determine how many collisions occur while monitoring the traffic of the network. This poses a problem in connection with the control of network.

In a second approach, a modem which intends to transmit data sends out two pulses at a random time interval prior to data transmission and monitors the transmission line for a period of time two times the maximum propagation time of the transmission line from the point of time at which the first pulse is sent out. If only two pulses are received during the period of time, it is assumed that no collision has occurred so that data transmission is commenced. This system is called "random pulse monitoring system".

This system, however, requires the time of monitoring for any collision every transmission of a data packet. This reduces the transmission efficiency, i.e., effective transmission capacity, of the network. Besides, like the first system, to ensure the compatibility with upper protocols, the modem is required to store data to be transmitted from the upper protocol while monitoring two random pulses. This complicates the hardware of modems.

In a third approach, the detection of a collision is done using a fact that a peak level of a beat signal resulting from an overlap of two signals transmitted from different modems is doubled when the two signals are in phase, for instance. This system is called "signal level detection system". This approach is free from the drawbacks in the previous first and second approaches, i.e., the incapability of collision detection by a receiving modem and the reduction of the network efficiency.

In this system, however, signals transmitted from all the other modems must be received through the transmission line by any modem at an equal and stable level. If the levels of the received signals are different, it becomes difficult to decide the occurrence of a collision.

From the standpoints of the signal transmission quality and collision detection in the CSMA/CD system, it is very important to make equal the levels of signals received by one interface from all the other interfaces.

However, with such modulation systems as VSB and duobinary AM/PSK systems which are currently attracting attentions in various aspects, the carrier frequency is not essentially varied. Therefore, the beat signal frequency resulting from a collision of signals is very low, and there is no quarantee that the double peak level due to overlap of in-phase signals is always obtained during the period during which a data packet is transmitted. This means that 100% reliable detection of collisions cannot be ensured.

SUMMARY OF THE INVENTION

An object of the invention is to provide a data transmission system for a local network having a plurality of data processors coupled by modems to a communication medium, which can reliably and quickly detect a collision of signals transmitted simultaneously from a plurality of data processors to the communication medium.

In the local network to which the data transmission system of the invention is applied, the transmission and reception of data among the data processors are effected using a carrier transmission system. To this end, each modem is arranged to shift a carrier frequency to a first and second frequency according to a digital signal from the associated data processor.

To attain the object of the invention noted above, the difference between the first and second frequencies is set such that one cycle period of a beat signal generated on the communication medium due to a collision of signals is within one bit time length of the digital signal.

According to the invention the minimum and maximum amplitudes of the beat signal always occur in one bit time length of the digital signal, so that it is possible to reliably detect a collision of signals within a period during which a data packet is transmitted (1.2 msec. at the most).

DETAILED DESCRIPTION OF THE PREFERRED EMBODIMENTS

Figure 1:
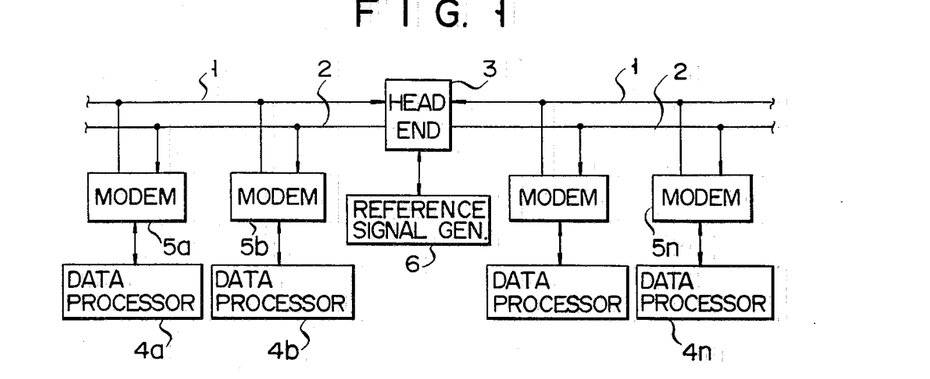
FIG. 1 shows a local network to which a data transmission system according to the invention may be applied.

FIG. 1 shows a network embodying the invention. Reference numeral 1 designates a transmission line, and 2 a reception line. These lines 1 and 2 are coupled together at a given point by a headend 3 which comprises directional couplers and an amplifier. In the headend 3, a signal on the transmission line 1 is coupled to the reception line 2 through the couplers and amplifier. A plurality of data processors 4 (4a to 4n) are connected via respective modems 5 (5a to 5n) as interfaces to the lines 1 and 2 at arbitrary points thereof. Although not shown, each modem 5 is connected to the lines 1 and 2 by directional couplers. Data transmitted from a data processor 4 is thus coupled by the associated modem 5 to the transmission line 1 and then coupled by the headend 3 to the reception line 2 to be received by each modem 5, which in turn applies the received data to the associated data processor 4. Data transmission between the data processors 4 is effected in this way. A reference level signal (i.e., pilot signal) generator 6 is connected to the headend 3.

The pilot signal generator 6 sends out a pilot signal at a reference level through the headend 3 to the receiving line 2 at a fixed time interval or a time interval depending on the traffic of the line, i.e., at proper timings. The duration of the pilot signal is set sufficiently long compared to the maximum data packet length (e.g., 1.2 msec.), e.g., 5 msec. The gains of receiving and transmitting amplifiers in each modem 5 are adjusted according to the pilot signal.

Figure 2:
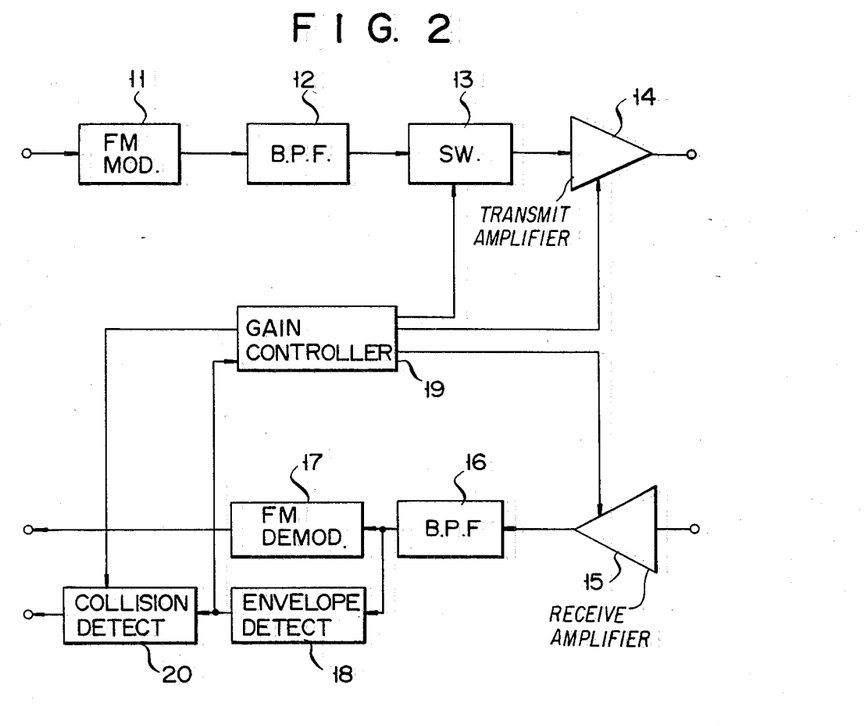
FIG. 2 shows a schematic arrangement of a modem.

The modem 5 has a construction as shown in FIG. 2. Data from the data processor 4 (which may be a baseband digital signal or code-modulated signal such as Manchester code signal) is coupled to a frequency modulator 11, to frequency modulate a carrier of a predetermined frequency in accordance with a frequency shift keying (FSK) system. The modulated-carrier signal is coupled through a bandpass filter 12 and an electronic switch 13 to a transmitting amplifier 14 to be amplified therein. The amplified signal is sent out to the transmission line 2.

A signal (i.e., modulated-carrier signal) transmitted from another modem is received by a receiving amplifier 15 to be amplified. The amplified received signal is coupled through a bandpass filter 16 to a frequency demodulator 17 to recover original digital data. The recovered digital data is fed to the data processor 4. The output signal of the bandpass filter 16 is also supplied to an envelope detector 18, which detects the envelope of the received signal. A gain controller 19 having a microcomputer adjusts the gains of transmitting and receiving amplifiers 14 and 15 according to the level of the received signal detected by envelope detector 18. The output signal of envelope detector 18 is also supplied to a collision detector 20. The collision detector 20 detects a collision of signals on the line by making use of the fact that a beat signal is generated as a result of a collision of signals. It generates a collision indicative signal when it detects a collision. The collision indicative signal is fed to data processor 4, which then inhibits the issuance of data. In this way, data transmission is effected according to the CSMA/CD system.

The gain controller 19 controls the electronic switch 13. For example, when the modem is not in a transmitting mode, the gain controller 19 disables switch 13 to prevent the carrier wave from being sent out to the transmitting line 2. Further, the gain controller 19 causes collision detector 20 to generate a coillision indicative signal during a gain control operation. The detection of a collision is achieved after the gains of transmitting and receiving amplifiers 14 and 15 are adjusted to the respective optimum levels by gain controller 18.

Figure 3:
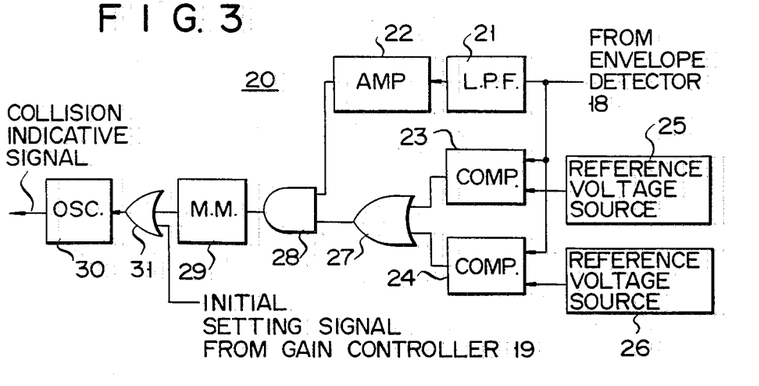
FIG. 3 shows a schematic arrangement of a collision detector.

Before describing the gain control operation, the collision detector 20 will be described with reference to FIG. 3. The output signal of envelope detector 18 is fed through a low-pass filter 21 to an amplifier 22. It is also applied to first and second comparators 23 and 24. These comparators 23 and 24 check the level of received signal with respect to reference voltages provided from respective first and second reference voltage generators 25 and 26 as threshold levels. The first reference voltage generator 25 gives a threshold level, which is slightly higher than a substantially constant received signal level detected by envelope detector 18 when only one modem transmits a signal. The comparator 23 generates an output signal when the received signal level exceeds the threshold level. The second reference voltage generator 26 provides a threshold level, which is slightly lower than the substantially constant received signal level. The second comparator 24 generates a signal when the received signal level is lower than the threshold. A collision of signals transmitted simultaneously from two or more modems is thus detected by making use of the fact that the amplitude of a beat signal resulting from a collision varies from zero level to twice the level of each transmitted signal. The output signal of first and second comparators 23 and 24 are fed to a monostable multivibrator 29 through an OR gate 27 and an AND gate 28 which is enabled by an output signal of amplifier 22 only during the presence of the received signal. The monostable multivibrator 29 thus generates a collision detection signal having a predetermined duration when a collision is detected. The output signal of monostable multivibrator 29, which holds a collision detection state for a predetermined period of time, drives an oscillator 30 which generates a collision indicative signal of, for instance, 10 MHz. The gain controller 19 supplies an initial setting signal to oscillator 30 through an OR gate 31, whereby the collision indicative signal is generated during the gain control operation.

The duration of the collision detect signal is determined on the basis of the following consideration.

Where data is transmitted unidirectionally as in this embodiment, a time delay occurs between the instant of transmission of a signal from a data processor and the instant of reception of the signal by the data processor.

Suppose now that two data processors are provided at an end of a transmission line and transmit almost simultaneously signals. In this case, a beat signal is generated on the transmission line due to a collision of signals. This beat signal, however, reaches the two data processors after the lapse of times corresponding to respective lengths of line. It is detected by each data processor, whereby the collision is detected. In response to the detection of collision, each data processor sets itself to a back-off state. More particularly, it suspends the transmission of data for a constant period of time, and it resumes the data transmission after a subsequent random period of time.

If another beat signal presents at the instant of suspension of the data transmission, it is transmitted on the reception line with a time delay. The presence of such beat signal constitutes an obstacle when resuming the data transmission. More specifically, while the data processor resumes the data transmission after the back-off, if it detects the beat signal on the receiving line, it decides that another collision has occurred and thus suspends the data transmission once again. If such an event occurs repeatedly for a predetermined number of times, the data processor can no longer quarantee the maintenance of a data packet which is to be transmitted. In such a case, it takes such a measure as cancelling the packet.

The occurrence of such a situation is highly possible in case where the line is long and thus the delay time is long. According to the invention, the collision detection signal is produced for a period of time required for the transmission of a signal from the end of transmission line most remote from the headend through the headend to the end of receiving line most remote from the headend (which time period is referred to as turn-around time). Thus turn-around time is the maximum period of time necessary until the vanishment of a beat signal. The problems discussed above can be solved by setting the period of the collision detection signal as mentioned above.

Figure 4:
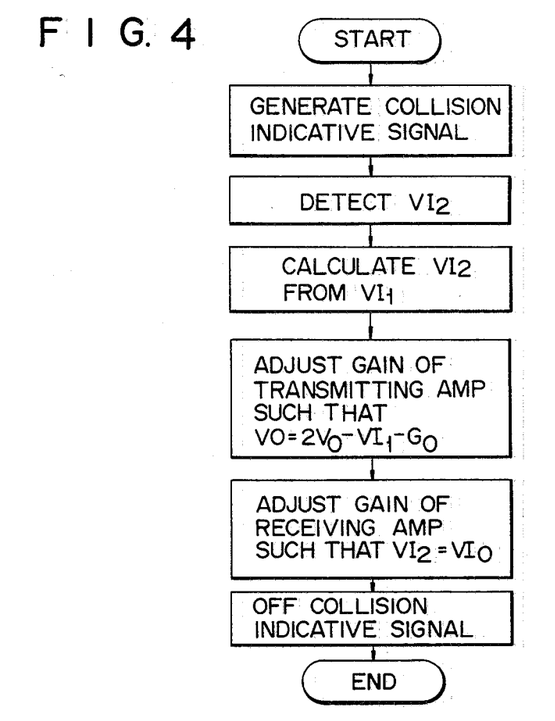
FIG. 4 is a flow chart for explaining the gain control operation of the modem to adjust the gains of transmitting and receiving amplifiers.

The open-loop gain control operation will now be described with reference to the flow chart of FIG. 4. The gain control operation is initiated by turning on a power source of modem 5. First, the gain controller 19 supplies an initial setting signal to collision-indicative signal generator 30, thus inhibiting data transmission from data processor 4. The electronic switch 13 is disabled to prevent the transmission of carrier. The pilot signal generator 6 supplies the pilot signal of a predetermined reference level to headend at proper timings. Therefore, each modem 5 receives the pilot signal from headend 3 via the reception line 2. The envelope detector 18 detects a reception level $VI_2$ of the pilot signal received by receiving amplifier 15. The gain controller 19 calculates an input level $VI_1$ of the pilot signal to modem 5 by subtracting the gain of receiving amplifier 15 from the detected level $VI_2$. The difference $V_0$-$VI_1$ between the pilot signal level $V_0$ at headend 3 and input signal level $VI_1$ corresponds to the level of attenuation of signal on receiving line 2 from headend 3 to receiving modem 5. The level of attenuation of signal on transmission line 1 from the modem 5 to the headend 3 can be thought to be equal to the attenuation level $V_0$-$VI_1$ of reception line. The gain controller 19 adjusts the gain of transmitting amplifier 14 according to the information mentioned above such that the level of the transmission signal from transmitting amplifier 14 at headend 3 becomes equal to the reference level $V_0$ of the pilot signal, in other words, such that the output level $VO$ of transmitting amplifier 14 is obtained which satisfies the following equation, $$V_0 = VO - (V_0 - VI_1) + G_0$$

or $$VO = 2V_0 - VI_1 - G_0,$$

where $G_0$ is the gain of headend 3.

The gain controller 19 then adjusts the gain of receiving amplifier 15 such that the reception level $VI_2$ of the pilot signal becomes a predetermined reception level $VI_0$. Thus, the adjustment of the gains of transmitting and receiving amplifiers 14 and 15 is completed so that the collision indicative signal is turned off to permit data transmission from data processor 4.

Now, a data transmission system advantageous for collision detection according to the invention will be described.

Figure 5:
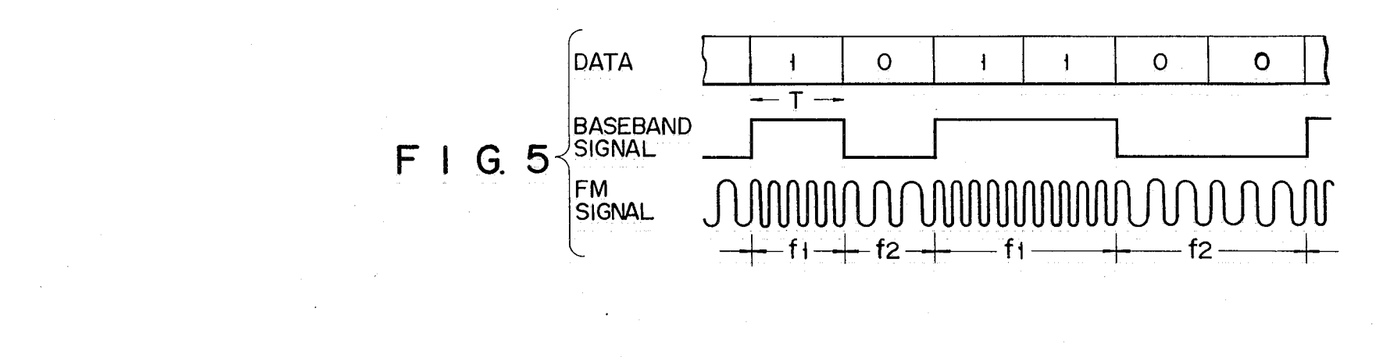
FIG. 5 is a diagram for explaining the modulation by a baseband signal.

Assuming that data transmitted from the data processor to the associated modem 5 in the network described above is a baseband signal as shown in FIG. 5, the frequency modulator 11 effects frequency shifts represented as follows:

$$f_1 = f_c + f_d$$

for transmission data of "1" (space), and $$f_2 = f_c - f_d$$

for transmission data of "0" (mark)
where $f_c$ is the and $f_d$ is a frequency deviation. In this modulation process, a modulation parameter $\Delta$ is set as follows:

$$\Delta = 2f_d \cdot T \geq 1$$

where T is the time interval of one bit of data. In other words, one cycle period of the beat signal is set equal or shorter than one bit time of the baseband signal.

Figure 6:
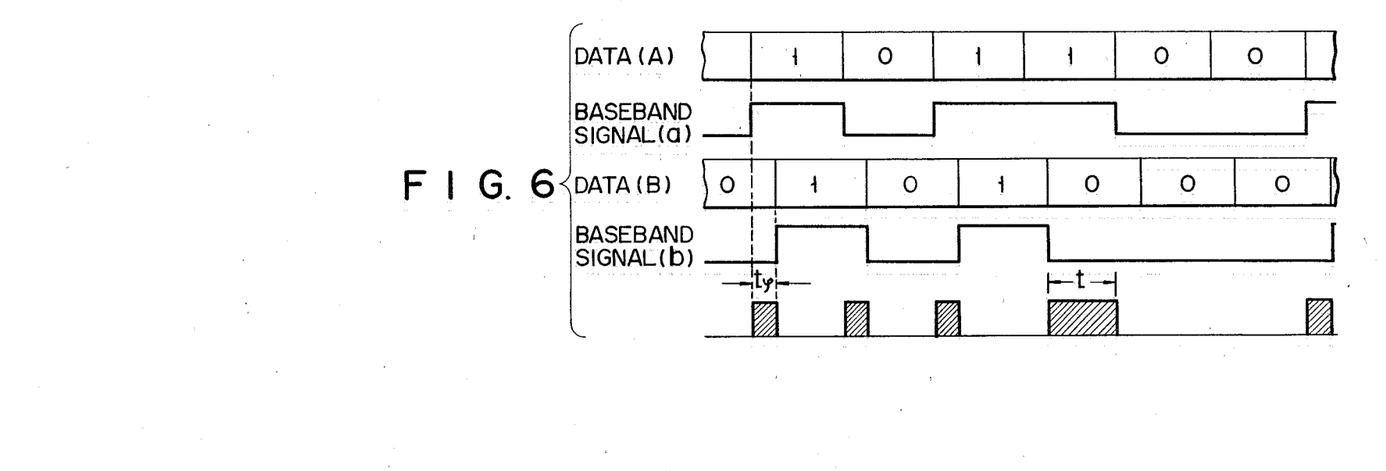
FIG. 6 is a diagram for explaining the collision of signals on a transmission line.

When two modems 5 transmit data with a time (or phase) difference $t_\phi$ as shown in FIG. 6, a signal difference is produced as shown by oblique-line portions. It also results from the difference in bit data. The time width t of the signal difference is minimum when the time difference $t_\phi$ is $$t_\phi = T/2.$$

At this time, it is $$t = T/2.$$

Figure 7:
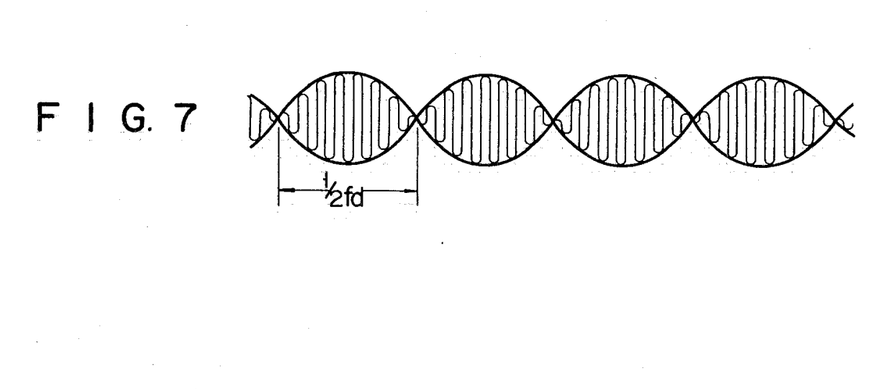
FIG. 7 shows a beat signal resulting from a collision of signals.

In the signal difference portions, a beat signal with a cycle of $f_d/2$, as shown in FIG. 7, is generated due to the frequency shift components of $f_1$ and $f_2$. The peak amplitude of the beat signal is substantially double the amplitude of a signal transmitted from modem 5.

It is to be noted that since the modulation parameter $\Delta$ of frequency modulator 11 is set to be 1 or above as described before, the following relation results $$\frac{1}{2} \cdot \frac{1}{2f_d} \leq \frac{T}{2} \leq t$$

This means that the beat signal amplitude always assumes either zero or double the amplitude of the transmitted signal during the time period T/2. Thus, when a collision occurs on the transmission line, the collision detector 20 can detect it quickly and reliably in the time interval T/2 of the baseband signal.

Figure 8:
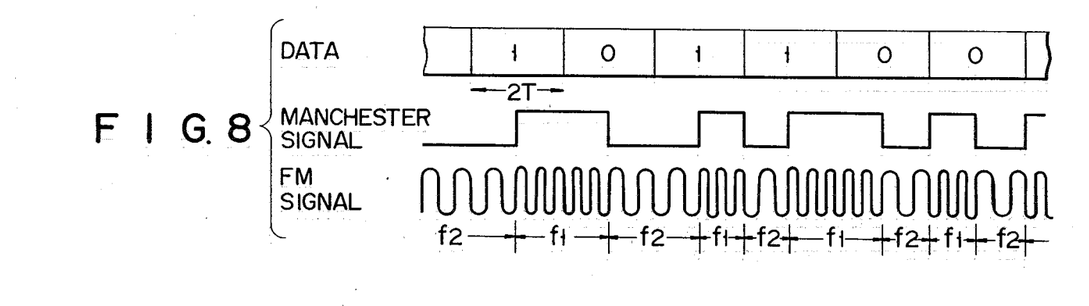
FIG. 8 is a diagram for explaining the modulation with a Manchester code signal.

It is now assumed that the data processor provides transmitting data as Manchester code signal as shown in FIG. 8. Again in this case, the modem 5 shifts the carrier frequency to $f_1$ or $f_2$ depending on whether the code signal is "1" or "0". The modulation parameter $\Delta$ at this time is set to $$\Delta = 2f_d T \geq 0.5.$$

Figure 9:
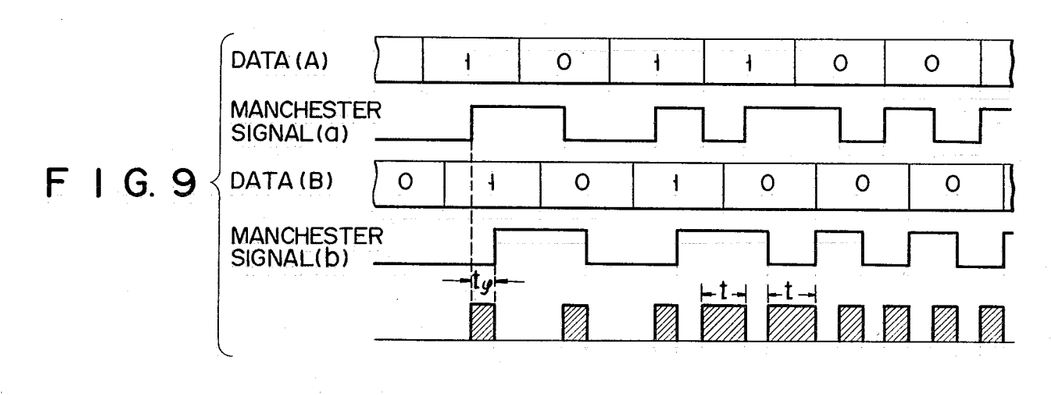
FIG. 9 is a diagram for explaining a collision of signals when the Manchester code signal is used.

In this case, when a collision occurs between two signals with a time (or phase) difference of $t_\phi$ therebetween, a signal difference as shown shaded is generated to cause generation of a similar beat signal. The duration of this beat signal is the minimum time T of "1" or "0" of the transmitted data. Since the modulation parameter $\Delta$ corresponding to the Manchester code signal is set to be 0.5 or above, the following results $$\frac{1}{2} \cdot \frac{1}{2f_d} \leq T = t$$

This means that the amplitude of the beat signal always assumes either zero or double the transmitted signal amplitude during the period T. Thus, a collision of signals on the line can be reliably detected.

As described above, according to this invention, the modulation parameter $\Delta$ is selected such that one cycle period of a beat signal generated due to collision is equal to or shorter than one bit time of the baseband signal or code modulated signal thereof. Thus, the collision can be detected very readily and reliably. In addition, unlike the prior art, there is no need of such process as monitoring the condition of the line by sending out two pulses prior to data transmission, so that it is possible to obtain very high network efficiency. Further, since a collision is detected from a beat signal on the line, it can be detected simultaneously by all the modems 5 connected to the line. Moreover, the modem 5 has a simple construction as described above and thus can be realized inexpensively.

Figure 10:
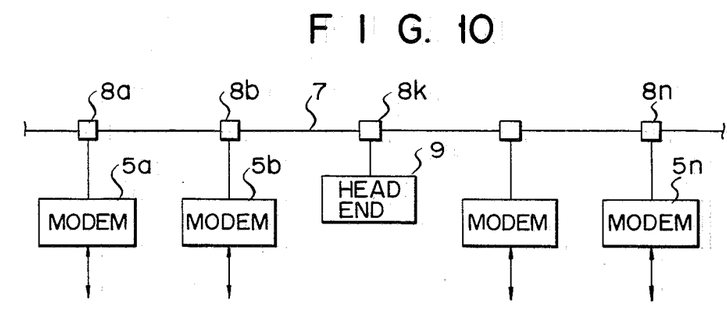
FIG. 10 shows another locak network.

The system as described above may be applied to a network as shown in FIG. 10. In this network, a single-conductor cable 7 is commonly used as transmitting and receiving lines. Data transmission is effected in a frequency division multiplexing system. A plurality of modems 5a to 5n and a headend 9 are coupled by respective directional couplers 8a to 8n to the line 7.

Figure 11:
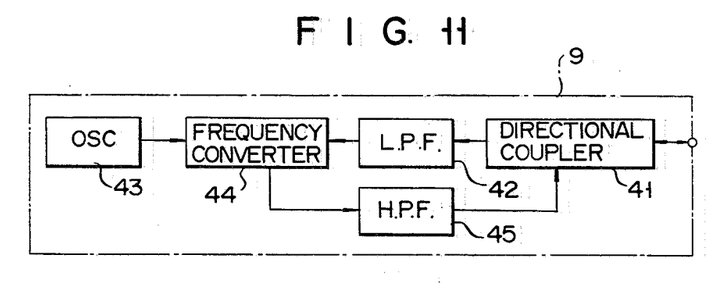
FIGS. 11 and 12 show arrangement which may be used in the local network of FIG. 10.

The headend 9 may be arranged as shown in FIG. 11. A directional coupler 41 is connected to directional coupler 8k on line 7. A low-pass filter 42 extracts a signal received through directional coupler 41. A frequency converter 44 frequency-converts the output signal of low-pass filter 42 by a signal from an oscillator 43. The frequency-conversion output of frequency converter 44 is coupled through a high-pass filter 45 to directional coupler 41. In this example, the transmitting and receiving signals are frequency divided with the former assigned to a lower frequency band and the latter to a higher frequency band. Where the frequency bands assigned to the transmitting and receiving signals are opposite, the low- and high-pass filters 42 and 45 may be interchanged.

Even in this single-conductor cable network, a beat signal generated on the cable is merely frequency converted in headend 9, that is, its cycle period is never changed, and also its amplitude can vary from zero to double amplitude level. The sole difference is its frequency components. Thus, like the previous embodiment, it is possible to detect a collision reliably.

Figure 12:
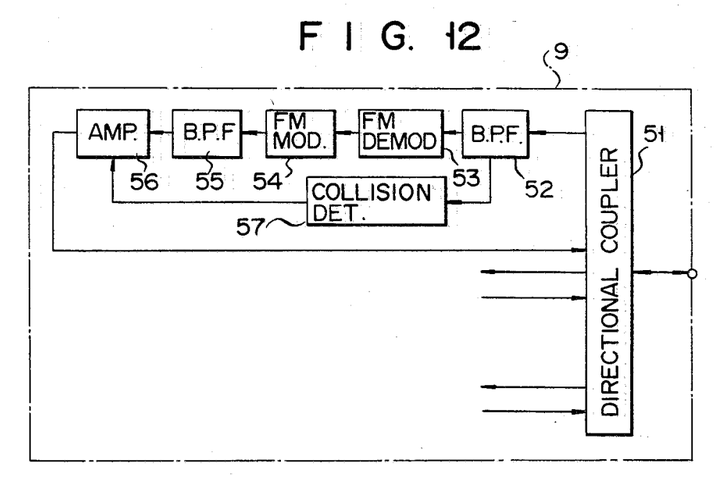

In case of a broadband network where more frequency bands are used, the headend 9 may be arranged as shown in FIG. 12. Signals picked up by a directional coupler 51 are separated through band-pass filters 52 provided for frequency bands. A frequency demodulator 53 demodulates a separated signal to recover a baseband signal therefrom, which in turn frequency-modulates another carrier by a frequency modulator 54. A bandpass filter 55 selectively passes the frequency-modulated signal to a transmitting amplifier 56, which sends out the frequency modulated signal to line 7 through directional coupler 51. A collision detector 57 detects a collision from the output of bandpass filter 52 in the manner as described earlier. When a collision is detected, the detector 57 doubles the gain of transmitting amplifier 56 so that the amplitude of a signal sent out from headend 9 is doubled. Namely, in this example, the headend 9 detects a collision from a beat signal, and doubles the amplitude of output signal to indicate a collision. This is because no beat signal is output from transmitting amplifier 56. It is to be noted that the same effects as described above can be obtained by such an arrangement.

In this arrangement of collision detection by headend 9, since a signal form headend 9 is free from a beat signal, the frequency modulation and demodulation are not essential; for example, it is possible to amplitude-modulate the signal to be sent out to the line.

While some preferred embodiments of the data transmission system according to the invention have been described, they are by no means intended to limit the scope of the invention. For example, in the above description the modulation parameter $\Delta$ was set to be 1 or above in case of the modulation of baseband signal itself and to 0.5 or above in case of the modulation of a Manchester code signal. However, since the threshold levels for the beat signal level detection are set between the "1" and "0" levels of signal and between the "1" level and the double level "1" level, and the phases of baseband signals and modulated signals are independent among modems 6, it is possible to ensure practically satisfactory collision detection even by reducing the modulation parameter $\Delta$ to one half (i.e., setting it to 0.5 in case of the modulation of the baseband signal and to 0.25 in case of the modulation of the Manchester code signal). As will be evident from the description, only one of the threshold levels may be used to detect a collision.

This invention may be applied to code-modulated signal other than the Manchester code signal. For example, even where the baseband signal is coded to a multi-level code signal, the modulation parameter $\Delta$ may be set such that one cycle period of a beat signal due to frequency shifts between adjacent levels is substantially one bit time of the baseband signal.

Furthermore, while the foregoing description has concerned with the frequency modulation, the invention is also applicable to a modulation system, in which the baseband signal is integrated and the resultant integrated signal is used for phase modulation. Generally, the invention is similarly applicable to modulation systems involving frequency shifts, e.g., a MSK (minimum shift keying) system or a CPS (continuous phase shift) system. Further, it is possible to permit detection of the peak or minimum amplitude level of a received carrier signal instead of the envelope level of the received signal. Further, the invention is applicable to systems using optical fiber cables as communication medium as well.

What is claimed is:

1. A data transmission system comprising:
   a communication medium;
   a plurality of data processors each arranged to transmit and receive an information signal in a digital form having mark and space periods; and
   a plurality of modems for coupling said data processors to said communication medium to effect transmission and reception of information signals among said data processors via said communication medium;
   each of said modems including:
   modulating means connected to receive an information digital signal from a corresponding data processor for shifting a carrier signal frequency to a first and second frequency according to the mark and space of the information digital signal, the modulated carrier signal being transmitted over said communication medium; and
   collision detecting means coupled to said communication medium for detecting a signal collision on the basis of a beat signal resulting from the difference between the first and second frequencies of modulated carrier signals simultaneously transmitted from modems to said communication medium to inhibit the corresponding data processor from issuing an information digital signal;
   the first and second frequencies being set such that one cycle period of the beat signal is shorter than or equal to a minimum time length of the mark and space periods of the information signal.

2. The data transmission system according to claim 1, wherein said communication medium is a double-conductor cable having a transmission line and a reception line; and further comprising a headend for coupling a signal transmitted from each modem from said transmission line to said reception line.

3. The data transmission system according to claim 1, wherein said communication medium is a single-conductor cable, and further comprising a headend for frequency converting a signal transmitted from each modem into a receiving frequency band signal.

4. The data transmission system according to claim 1, wherein the information digital signal from the data processor is a non-coded digital signal.

5. The data transmission system according to claim 1, wherein the information digital signal from the data processor is a coded signal.

6. The data transmission system according to claim 5, wherein the coded signal is a Manchester coded signal.

7. A data transmission system comprising:
   a communication medium;
   a plurality of data processors each arranged to transmit and receive an information signal in a digital form having mark and space periods; and
   a plurality of modems for coupling said data processors to said communication medium to effect transmission and reception of information signals among said data processors via said communication medium;
   each of said modems including:
   modulating means connected to receive an information digital signal from a corresponding data processor for shifting a carrier signal frequency to a first and a second frequency according to the mark and space of the information digital signal, the modulated carrier signal being transmitted over said communication medium;
   a modulation factor defined by a product of the difference between the first and second frequencies and a minimum time length of the mark and space periods of the information digital signal being set to 1 or above so that one cycle period of a beat signal resulting from the difference between the first and second frequencies of modulated carrier signals simultaneously transmitted from modems to said communication medium is within a minimum time length of the mark and space periods of the information digital signal.

8. A data transmission system comprising:
   a communication medium;
   a plurality of data processors each arranged to transmit and receive an information signal in a digital form having mark and space periods; and
   a plurality of modems for coupling said data processors to said communication medium to effect transmission and reception of information signals among said data processors via said communication medium;
   each of said modems including:
   modulating means connected to receive an information digital signal from a corresponding data processor for shifting a carrier signal frequency to a first and a second frequency according to the mark and space of the information digital signal, the modulated carrier signal being transmitted over said communication medium; and
   a modulation factor defined by a product of the difference between the first and second frequencies and a minimum time length of the mark and space periods of the information digital signal being equal to or greater than 0.5.

9. The data transmission system according to claim 8, wherein the information digital signal from the corresponding data processor is a non-coded digital signal and the minimum time length of the mark and space periods of the information digital signal is one bit time length of the non-coded digital signal.

10. The data transmission system according to claim 8, wherein the information digital signal from the corresponding data processor is a coded digital signal.

11. The data transmission system according to claim 10, wherein the coded digital signal is a Manchester coded digital signal.

* * * * *